US011022014B1

(12) United States Patent
Parrish et al.

(10) Patent No.: US 11,022,014 B1
(45) Date of Patent: Jun. 1, 2021

(54) EXHAUST AFTERTREATMENT SYSTEM WITH HEATED FLASH-BOILING DOSER

(71) Applicant: Faurecia Emissions Control Technologies, USA, LLC, Columbus, IN (US)

(72) Inventors: Tony Parrish, Columbus, IN (US); John Rohde, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/860,721

(22) Filed: Apr. 28, 2020

(51) Int. Cl.
*F01N 3/20* (2006.01)
*F01N 3/02* (2006.01)
*F01N 5/02* (2006.01)

(52) U.S. Cl.
CPC .......... *F01N 3/2013* (2013.01); *F01N 3/206* (2013.01); *F01N 3/208* (2013.01); *F01N 3/0205* (2013.01); *F01N 3/2066* (2013.01); *F01N 5/025* (2013.01); *F01N 2560/06* (2013.01); *F01N 2610/1406* (2013.01); *F01N 2610/146* (2013.01)

(58) Field of Classification Search
CPC ........ F01N 3/2013; F01N 3/208; F01N 3/206; F01N 2560/06; F01N 5/025; F01N 2610/146; F01N 2610/1406; F01N 3/0205; F01N 3/2066
See application file for complete search history.

(56) References Cited

U.S. PATENT DOCUMENTS

| 4,486,270 | A | 12/1984 | Kaasenbrood |
| 5,240,688 | A | 8/1993 | Von Harpe |
| 5,590,521 | A | 1/1997 | Schnaibel |
| 5,827,490 | A | 10/1998 | Jones |
| 6,077,491 | A | 6/2000 | Cooper |
| 7,449,162 | B2 | 11/2008 | Schaller |
| 7,595,034 | B2 | 9/2009 | Nissinen |
| 7,984,609 | B2 | 7/2011 | Doering |

(Continued)

FOREIGN PATENT DOCUMENTS

| CH | 707551 | 8/2014 |
| CN | 104265422 | 1/2015 |

(Continued)

OTHER PUBLICATIONS

Zhangfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Brandon D Lee
(74) *Attorney, Agent, or Firm* — Barnes & Thornburg LLP

(57) ABSTRACT

An exhaust aftertreatment system for use with an over-the-road vehicle is disclosed. The exhaust aftertreatment system includes a flash-boil doser mounted to an exhaust conduit and a catalyst coupled to the exhaust conduit. The flash-boil doser configured to inject heated and pressurized reducing agent into an exhaust passageway defined by the exhaust conduit for distribution throughout exhaust gases passed through the exhaust conduit. The catalyst configured to react the reducing agent with the nitrous oxide in the flow of exhaust gases to provide treated exhaust gases with a reduced nitrous oxide amount.

15 Claims, 4 Drawing Sheets

(56) References Cited

U.S. PATENT DOCUMENTS

Figure 1:
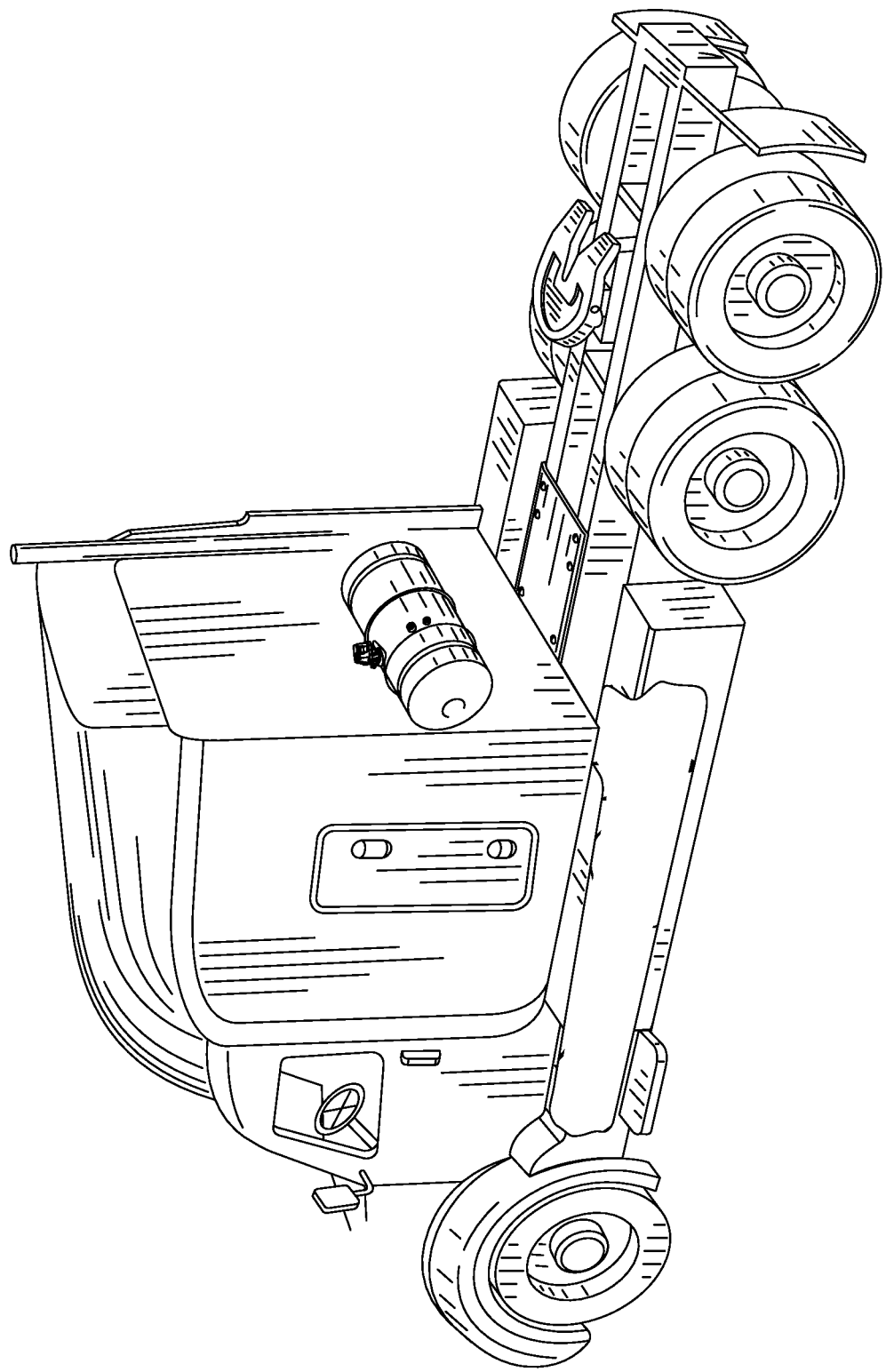

| | | | |
|---|---|---|---|
| 8,100,191 B2 | 1/2012 | Beheshti | |
| 8,413,427 B2 | 4/2013 | Mullins | |
| 8,418,443 B2 | 4/2013 | Millet | |
| 8,518,354 B2 | 8/2013 | Ayyappan | |
| 8,763,372 B2 | 7/2014 | Pohl | |
| 8,800,276 B2 | 8/2014 | Levin | |
| 8,893,484 B2 | 11/2014 | Park | |
| 8,967,484 B2 | 3/2015 | Nishizawa | |
| 8,980,181 B2 * | 3/2015 | Qi | F01N 3/208 422/111 |
| 9,072,850 B2 | 7/2015 | McIntosh | |
| 9,341,100 B2 | 5/2016 | Petry | |
| 9,512,760 B2 | 12/2016 | Clayton, Jr. | |
| 9,598,977 B2 | 3/2017 | Meyer | |
| 9,683,447 B2 | 6/2017 | Gentile | |
| 9,687,782 B1 | 6/2017 | Miao | |
| 9,732,650 B2 | 8/2017 | Tomita | |
| 9,771,850 B2 | 9/2017 | Henry | |
| 10,337,380 B2 | 7/2019 | Willats | |
| 2003/0079467 A1 | 5/2003 | Liu | |
| 2005/0045179 A1 | 3/2005 | Faison | |
| 2006/0218902 A1 | 10/2006 | Arellano | |
| 2009/0031713 A1 | 2/2009 | Suzuki | |
| 2009/0223211 A1 | 9/2009 | Brueck | |
| 2009/0294552 A1 | 12/2009 | Trapasso | |
| 2012/0322012 A1 | 12/2012 | Tsumagari | |
| 2013/0232295 A1 | 9/2013 | Benhase et al. | |
| 2013/0239549 A1 | 9/2013 | Henry et al. | |
| 2013/0259755 A1 | 10/2013 | Kim | |
| 2014/0314644 A1 | 10/2014 | Bugos | |
| 2014/0363358 A1 | 12/2014 | Udd | |
| 2015/0135683 A1 | 5/2015 | Petry | |
| 2015/0315950 A1 | 11/2015 | Hagimoto | |
| 2016/0017780 A1 | 1/2016 | Kinugawa | |
| 2016/0053652 A1 | 2/2016 | Van Vuuren | |
| 2016/0061083 A1 | 3/2016 | Pramas | |
| 2017/0122169 A1 | 5/2017 | Ettireddy | |
| 2017/0198621 A1 | 7/2017 | Gaiser et al. | |
| 2017/0204762 A1 | 7/2017 | Kotrba | |
| 2018/0080360 A1 | 3/2018 | Kurpejovic | |
| 2018/0142593 A1 | 5/2018 | Wang | |
| 2019/0383187 A1 | 12/2019 | Sarsen | |
| 2020/0131966 A1 | 4/2020 | Jeannerot | |

FOREIGN PATENT DOCUMENTS

| | | |
|---|---|---|
| DE | 102009005012 | 7/2010 |
| DE | 102017101310 | 8/2017 |
| DE | 102018209405 | 12/2019 |
| EP | 2140117 | 1/2010 |
| EP | 2167860 | 3/2010 |
| EP | 2302276 | 3/2011 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| GB | 2568269 | 5/2019 |
| JP | 2015078643 | 4/2015 |
| JP | 2020139426 | 9/2020 |
| KR | 20170013687 | 2/2017 |
| WO | 199956858 | 11/1999 |
| WO | 2005025725 | 3/2005 |
| WO | 2006087553 | 8/2006 |
| WO | 2007124791 | 11/2007 |
| WO | 2008077587 | 7/2008 |
| WO | 2008108955 | 9/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as $NH_3$-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

Extended European Search Report for European Appl. No. 19207953.1, dated Mar. 13, 2020, 7 pages.

Office Action dated Apr. 3, 2020, for U.S. Appl. No. 16/184,567 (pp. 1-15).

\* cited by examiner

EXHAUST AFTERTREATMENT SYSTEM WITH HEATED FLASH-BOILING DOSER

BACKGROUND

The present disclosure relates to exhaust aftertreatment systems for automotive applications, and particularly to the incorporation of flash-boil dosers into such systems.

SUMMARY

An automotive exhaust aftertreatment system including flash-boil doser and a catalyst is described in this paper. The aftertreatment system is configured to mix a reducing agent injected by the flash-boil doser with exhaust gas moving through the system. The mixing of the reducing agent with exhaust gas is designed to cause a chemical reaction and reduce Nitrous Oxides (NOx) in the exhaust gas when reacted by the catalyst.

In illustrative embodiments, the system also includes a waste heat recovery system. The waste heat recovery system is positioned downstream of the catalyst to recover heat from the treated exhaust gases exiting the system and provide the recovered heat to heat other components of the aftertreatment system, such as an active heating element and a passive heat exchanger included in the flash-boil doser that are configured to heat the reducing agent before injection into the system.

In particular, the waste heat recovery system fluidly is configured to selectively transfer heat from the treated exhaust gases directly to the flash-boil doser. The waste heat recovery system is fluidly coupled to the passive heat exchanger to provide the heat from the treated exhaust gases to the passive heat exchanger. The passive heat exchanger withdraws heat from the treated exhaust gases to heat the reducing agent in the flash-boil chamber and at least reduce an amount of electrical power used by the active heating element.

In other embodiments, the waste heat recovery system may be configured to selectively generate electrical power from the heat of the treated exhaust gases in the exhaust passageway. The waste heat recovery system may be coupled to the active heating element of the flash-boil doser to provide the electrical power generated from the heat of the treated exhaust gases to the active heating element to heat the reducing agent in the flash-boil chamber.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
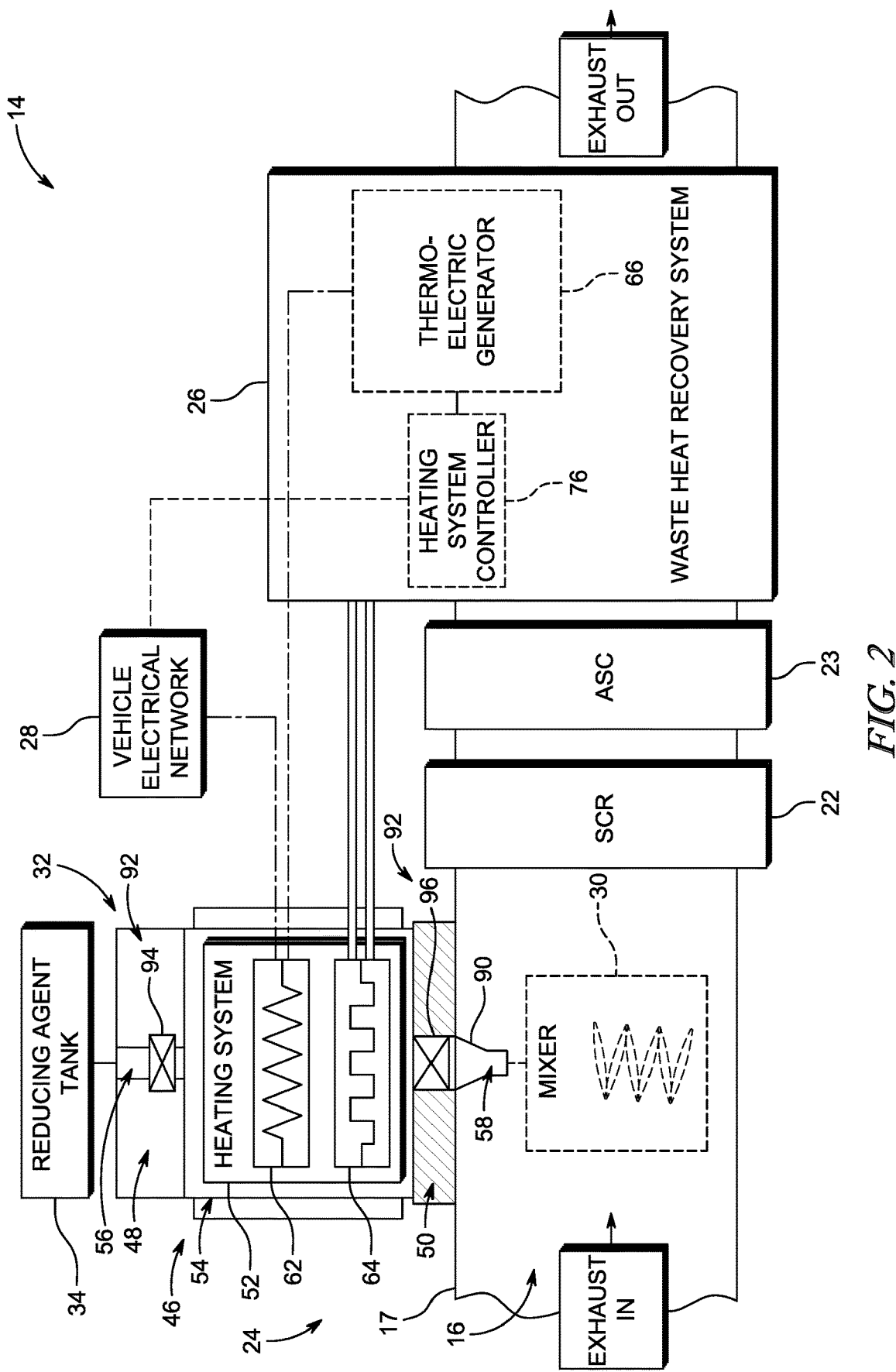
Figure 3:
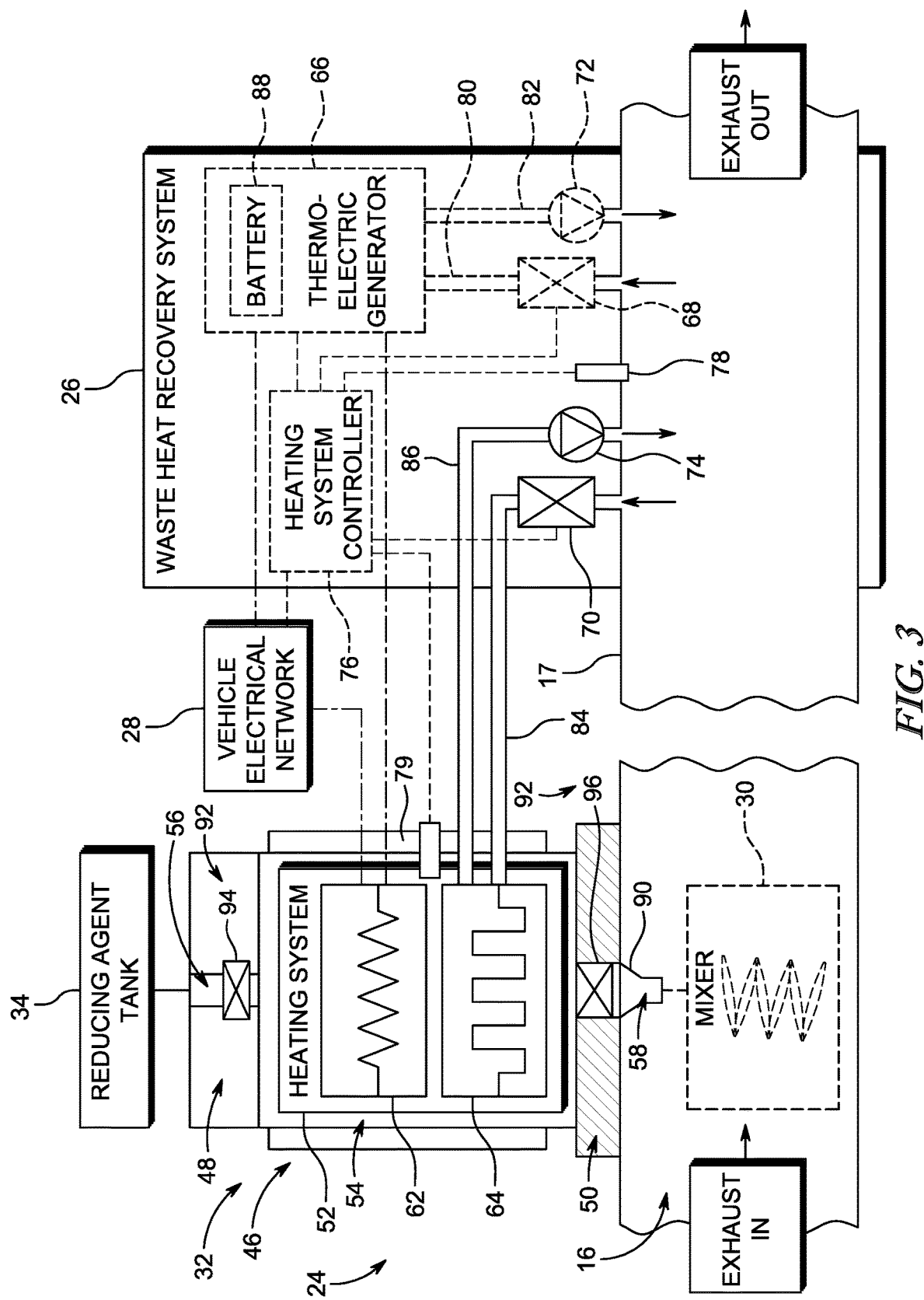
Figure 4:
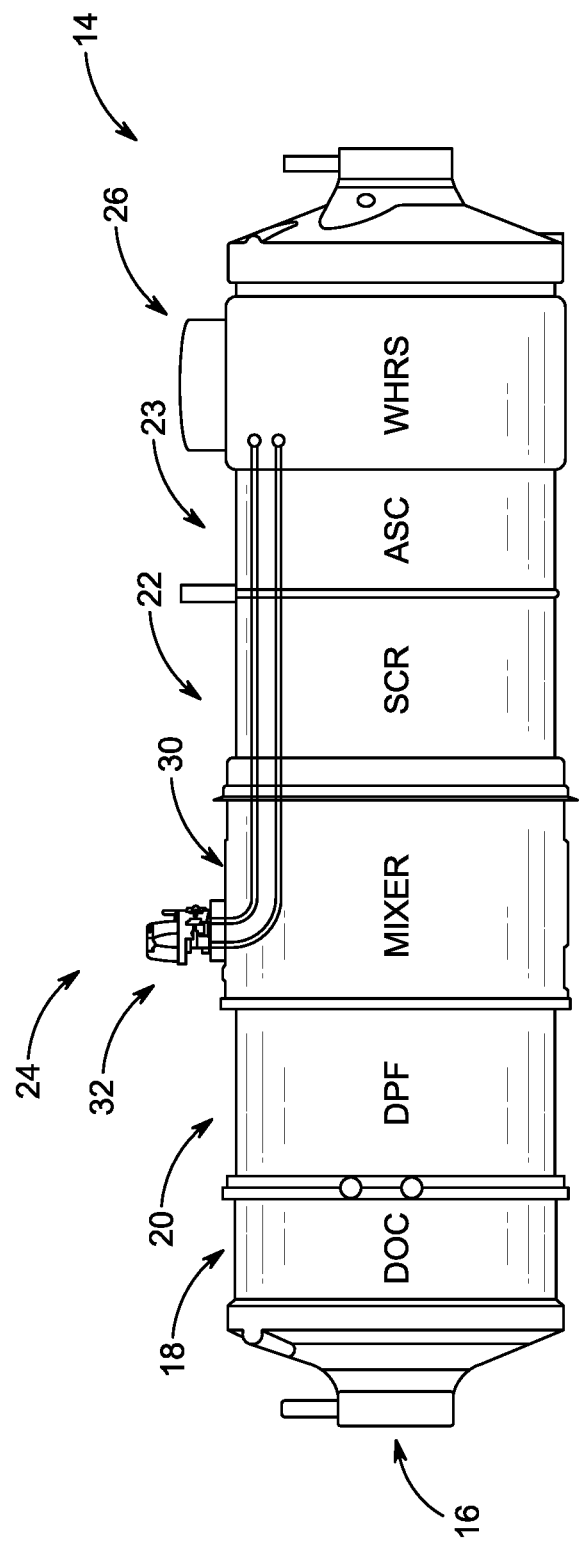

The detailed description particularly refers to the accompanying figures in which:

FIG. 1 is perspective view of an over-the-road automotive vehicle including an internal combustion engine and an exhaust aftertreatment system with a flash-boil doser configured to deliver a reducing agent into engine exhaust gases flowing through an exhaust conduit;

FIG. 2 is a diagrammatic view of the exhaust aftertreatment system included in the over-the-road vehicle of FIG. 1 showing that the exhaust aftertreatment system includes the flash-boil doser, a catalyst coupled to the exhaust conduit to react the reducing agent with the nitrous oxide in the engine exhaust gases, and a waste heat recovery system coupled to the exhaust conduit downstream of the catalyst to transfer heat from the treated exhaust gases directly to the flash-boil doser;

FIG. 3 is a detail diagrammatic view of the system of FIG. 2 showing the waste heat recovery system includes at least one valve to control the flow of treated exhaust gases from the exhaust passageway to the waste heat recovery system, a heating system controller coupled to the valve to selectively control the heating of the flash-boil doser, and optionally a thermoelectric-generator coupled to the exhaust passageway to receive treated exhaust gases and generate electrical power from the heat of the treated exhaust gases;

FIG. 4 is a diagrammatic view of the exhaust aftertreatment system included in the over-the-road vehicle of FIG. 1 showing the waste heat recovery system is located downstream of a plurality of exhaust aftertreatment devices included in the aftertreatment system that remove or reduce different effluents to provide the treated exhaust gases.

DETAILED DESCRIPTION

For the purposes of promoting an understanding of the principles of the disclosure, reference will now be made to a number of illustrative embodiments illustrated in the drawings and specific language will be used to describe the same.

An illustrative over-the-road vehicle 10 includes an engine 12 and an exhaust aftertreatment system 14 in accordance with the present disclosure is shown, for example, in FIG. 1. The engine 12 is, illustratively, an internal combustion engine 12 configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, a reducing agent mixer 24, and a waste heat recovery system 26. The exhaust gases pass through or by each of the aftertreatment devices to remove or reduce different effluents. The reducing agent mixer 24 is mounted upstream of the SCR 22 and is configured to inject and mix a reducing agent, illustratively a urea solution, into the exhaust gases. Chemical reaction of the reducing agent with the exhaust gases occurs in downstream of the reducing agent mixer 24 in the SCR 22 to reduce NOx to produce treated exhaust gases before being released in the atmosphere. The waste heat recovery system 26 is coupled to the exhaust conduit 17 downstream of the SCR 22 to receive the treated exhaust gases flowing through the exhaust passageway 16 and is configured to recover heat from the treated exhaust gases.

The waste heat recovery system 26 is configured to use the recovered heat from the exhaust gases to manage temperatures in the exhaust aftertreatment system 14 as shown in FIG. 3. The waste heat recovery system 26 is configured to use the exhaust gases to passively heat other components of the exhaust aftertreatment system 14. In some embodiments, the waste heat recovery system is optionally configured to generate electrical energy to power other components of the vehicle 10.

In typical embodiments, the vehicle 10 includes an electrical network 28 coupled to the engine 12 as shown in FIGS. 2 and 3. The electrical network 28 is powered by an alternator driven by the engine 12 to produce electrical power that supplies power to other components of the vehicle 10. By utilizing the heat from the treated exhaust gases, the waste heat recovery system 26 reduces the electrical energy provided by the electrical network 28 to the exhaust aftertreatment system 14 and thus reduces the resulting CO2 emissions from the engine 12.

Turning again to the reducing agent mixer 24, the mixer 24 includes a mixing can 30 and a flash-boil doser 32 as shown in FIGS. 2 and 3. The mixing can 30 is coupled fluidly with the exhaust passageway 16 to receive the exhaust gases flowing there through. The reducing agent is stored on the vehicle 10 in a reducing agent tank 34 included in the exhaust aftertreatment system 14 and is conducted to the flash-boil doser 32 for heating prior to being discharged by the flash-boil doser 32 into a mixing chamber 36 defined by the mixing can 30. The flash-boil doser 32 is configured to inject reducing agent into the mixing can 30 at a predetermined flow rate with each injection pulse.

The flash-boil doser 32 includes a doser body 46, doser inlet and outlet 48, 50, and a heating system 52. The doser body 46 defines a flash-boil chamber 54. The heating system 52 is arranged in the flash-boil chamber 54 to heat reducing agent and thereby increase a pressure within the flash-boil chamber 54. The doser inlet 48 is coupled to the doser body 46 and defines an inlet passageway 56 that opens into the flash-boil chamber 54 to admit reducing agent from the reducing agent tank 34. The doser outlet 50 is coupled to the doser body 46 and defines an outlet passageway 58 that opens from the flash-boil chamber 54 into the mixing chamber 36 of the mixing can 30 and, hence, the exhaust passageway 16.

The doser outlet 50 includes an outlet tube 90 defining the outlet passageway 58 and a pressure-activated outlet valve 92 that blocks or allows flow through the outlet passageway 58 in response to the pressure within the flash-boil chamber 54 as shown in FIGS. 2 and 3. The pressure-activated outlet valve 92 is configured to move from a normally-closed position to an open position when a predetermined pressure within the flash-boil chamber 54 is reached. Once the predetermined pressure is reached, the reducing agent is discharged from the flash-boil chamber 242 through the outlet passageway 58 and into the exhaust passageway 16 for mixing with the exhaust gases therein.

The pressure-activated outlet valve 92 includes an inlet valve 94 and an outlet valve 96 as shown in FIGS. 2 and 3. The inlet valve 94 blocks or allows from through the inlet passageway 56, while the outlet valve 96 blocks or allows flow through the outlet passageway 58. A connector rod (not shown) mechanically interconnects the inlet valve 94 and the outlet valve 96. The connector rod is configured to cause the inlet valve 94 to move to a closed position in response to motion of the pressure-activated outlet valve 92 to the opened position and to cause the inlet valve 94 to move to an opened position in response to motion of the pressure-activated outlet valve to the closed position. Reducing agent is admitted into the flash-boil chamber 54 when the inlet valve 94 is in the opened position and discharged from the flash-boil chamber 54 when the outlet valve 96 is in the opened position in response to the pressure within the flash-boil chamber 54 reaching the predetermined pressure.

The heating system 52 includes an active heating element 62 and a passive heat exchanger 64 as shown in FIGS. 2 and 3. The active heating element 62 is coupled to the electrical network 28 of the vehicle 10 and the waste heat recovery system 26 to selectively receive electrical power causing the active heating element 62 to heat the reducing agent in the flash-boil chamber 54. The passive heat exchanger 64 is coupled to the waste heat recovery system 26 to receive treated exhaust gases from the exhaust passageway 16 and withdraw heat from the treated exhaust gases to heat the reducing agent in the flash-boil chamber 54. The active heating element 62 and the passive heat exchanger 64 heat the reducing agent in the flash-boil chamber 54 to increase the pressure to the predetermined pressure so as to activate the pressure-activated outlet valve 92.

In the illustrative embodiment, the active heating element 62 is an electric resistive heating element that generates heat by passing an electrical current through a conductive material, i.e. a resistor. The electrical network 28 and the waste heat recovery system 26 provide the electrical current to the active heating element 62, which causes the resistor to generate heat to heat the reducing agent in the flash-boil doser 32.

In some embodiments, the active heating element 62 is a ceramic heating element. Similar to resistive heating elements that use metallic materials such as wire, the ceramic heating element generates heat by passing an electrical current through a ceramic material or ceramic plates. The electrical network 28 and the waste heat recovery system 26 provide the electrical current to the active heating element 62, which causes the resistor to generate heat to heat the reducing agent in the flash-boil doser 32. In other embodiments, the active heating element 62 is another type of electrical resistive heating element that actively generates heat when provided electrical power or current.

The waste heat recovery system 26 includes a heat exchanger inlet valve 70 and a check valve 74 as shown in FIG. 3. The valves 70, 74 are configured to selectively control the flow of treated exhaust gases between the exhaust passageway 16 and the passive heat exchanger 64. The heat exchanger inlet valve 70 is coupled to an inlet channel 84 to the passive heat exchanger 64 and configured to selectively allow a flow of treated exhaust gases to be supplied to the passive heat exchanger 64. The check valve 74 is coupled to the outlet channel 86 from the passive heat exchanger 64. The check valve 74 is configured to allow the flow of treated exhaust gases to return to the exhaust passageway 16, but prevent exhausts gases flowing through the exhaust passageway 16 from flowing back into the outlet channel 86.

In the illustrative embodiment, the waste heat recovery system 26 optionally includes a thermoelectric-generator 66 and a heating system controller 76 as suggested in FIGS. 2 and 3. The thermoelectric-generator 66 is configured to selectively receive treated exhaust gases from the exhaust passageway 16 and generate electrical power from the heat of the treated exhaust gases. The heating system controller 76 is coupled to the electrical network 28, the thermoelectric-generator 66, and the valve 70 and configured to selectively modulate heat from the active and passive elements of the heating system 52 in the flash-boil chamber 54.

In the illustrative embodiment, the thermoelectric-generator 66 is coupled to the active heating element 62 and the vehicle electrical network 28 as suggested in FIGS. 2 and 3. The thermoelectric-generator 66 is coupled to the active heating element 62 to supply power to the active heating element 62 to cause the active heating element 62 to heat the reducing agent in the flash-boil doser 32. In some embodiments, the thermoelectric-generator 66 is configured to provide electrical power to the other electrical components in the vehicle electrical network 28 to reduce the amount of power needed to be generated by the alternator.

In the illustrative embodiment, the waste heat recovery system 26 may further include a generator inlet valve 68 and a check valve 72 as suggested in FIG. 3. The valves 68, 72 are configured to selectively allow treated exhaust gases to enter and exit the thermoelectric-generator 66. The generator inlet valve 68 is coupled to an inlet channel 80 to the thermoelectric-generator 66 and configured to selectively allow a flow of treated exhaust gases to be supplied to the generator 66. The check valve 72 is coupled to the corresponding an outlet channel 82 from the thermoelectric-generator 66. The check valve 72 is configured to allow the flow of treated exhaust gases to return to the exhaust passageway 16, but prevent exhausts gases flowing through the exhaust passageway 16 from flowing back into the outlet channel 82.

In other embodiments, the waste heat recovery system 26 may include a single inlet valve. The single inlet valve may be coupled to the inlet channels 80, 84 to selectively allow treated exhaust gases to be supplied to one of the generator 66 and the passive heat exchanger 64.

The heating system controller 76 is coupled to the heat exchanger inlet valve 70 as shown in FIG. 3. The heating system controller 76 is configured to selectively open and close the heat exchanger inlet valve 70 to control and optimize heating of the doser 32 to reduce the amount of electrical energy provided by the electrical network 28 of the vehicle 10. The heating system controller 76 is configured to selectively direct the heat exchanger inlet valve 70 to open and close to manage the heat provided by the passive heat exchanger 64 to the reducing agent in the flash-boil doser 32.

In the illustrative embodiment, the heating system controller 76 is coupled to the generator inlet valve 68 as suggested in FIG. 3. The heating system controller 76 is configured to selectively open and close the generator inlet valve 68 to control the amount of electrical power generated by the thermoelectric-generator 66.

In the illustrative embodiment, the waste heat recovery system 26 further includes sensors 78, 79 as shown in FIG. 3. The sensors 78, 79 are coupled to the heating system controller 76 such that the heating system controller 76 is configured selectively modulate heat from the active and passive elements of the heating system 52 in the flash-boil chamber 54 based on information measured by the sensors 78, 79.

In the illustrative embodiment, the sensor 78 is a temperature sensor 78 as shown in FIG. 3. The temperature sensor 78 is configured to measure the temperature of the treated exhaust gases flowing through the exhaust passageway 16. The heating system controller 76 is configured to selectively modulate heat from the active and passive elements 62, 64 of the heating system 52 in the flash-boil chamber 54 based the temperature measurements from the temperature sensor 78.

In the illustrative embodiment, the flash-boil doser 32 further includes a temperature sensor 79 as shown in FIG. 3. The temperature sensor 79 is configured to measure the temperature of the reducing agent in the flash-boil chamber 54. The heating system controller 76 is configured to selectively modulate heat from the active and passive elements 62, 64 of the heating system 52 in the flash-boil chamber 54 based the temperature measurements from the temperature sensor 79 in the doser 32.

For instance, at low temperatures (i.e. cold start) or low load engine duty cycles, the temperature of the treated exhaust gases may not be hot enough for the waste heat recovery system 26 to effectively generate electrical power and/or withdraw heat. As such, the heating system controller 76 is configured to direct the electrical network 28 to supply electrical power to the active heating element 62 if the temperature measured by the temperature sensor 78 is below a predetermined value.

The heating system controller 76 is configured to direct the heat exchanger inlet valve 70 to open if the temperature measured by the temperature sensor 78 is above a predetermined value. If the temperature of the treated exhaust gases is above the predetermined value, the heat withdrawn from the exhaust gases by the passive heat exchanger 64 is high enough to effectively heat the reducing agent in the doser 32. By opening the heat exchanger inlet valve 70, the flow of treated exhaust gases is supplied to the passive heat exchanger 64 to heat the reducing agent in the flash-boil chamber 54.

Likewise, the heating system controller 76 may be configured to direct the generator inlet valve 68 to open if the temperature measured by the temperature sensor 78 is above a predetermined value. If the temperature of the treated exhaust gases is above the predetermined value, the heat from the exhaust gases is high enough for the thermoelectric-generator 66 to generate electrical power from the heat. By opening the generator inlet valve 68, the flow of treated exhaust gases is supplied to the thermoelectric-generator 66 to generate electrical energy.

The heating system controller 76 may be configured to direct the thermoelectric generator 66 and/or the electrical network 28 to stop supplying electrical energy if the heat exchanger inlet valve 70 is opened. Alternatively, the heating system controller 76 may also be configured to direct one of the electrical network 28 and the thermoelectric-generator 66 to supply electrical power to the active heating element 62 if the temperature measured by the temperature sensor 79 in the flash-boil chamber 54 is below a predetermined value.

The heating system controller 76 may also be configured to direct the thermoelectric generator 66 and/or the electrical network 28 to remain supplying electrical energy while the heat exchanger valve 70 is open. In such embodiments, the thermoelectric generator 66 and/or the electrical network 28 may continue to supply electrical energy if the temperature measured by the temperature sensor 79 is below a predetermined value and the temperature measured by the temperature sensor 78 is above the predetermined value. In other words, the passive heat exchanger 64 may be withdrawing some heat from the treated exhaust gases, but may not sufficiently heating the reducing agent. The heating system controller 76 may direct the active heating element 62 to heat the reducing agent in tandem to maintain the temperature of the reducing agent but reduce the amount of electrical energy used.

The heating system controller 76 may also configured to direct the thermoelectric-generator 66 to supply electrical power based on the amount of amount of electrical power generated and stored. In some embodiments, the thermoelectric-generator 66 includes a battery 88 for storing the electrical power generated as suggested in FIG. 3. In some cases, the temperature of the treated exhaust gases measured by the temperature sensor 78 may be below the predetermined value, but the thermoelectric-generator 66 may have enough electrical energy stored in the battery 88 to supply the active heating element 62. As such, the heating system controller 76 may be configured to direct the thermoelectric-generator 66 to supply electrical power to the active heating element 62 if the amount of electrical energy stored is above a predetermined value.

If the amount of energy stored is below the predetermined value, the heating system controller 76 may be configured to one of several options. The heating system controller 76 may be configured to direct the electrical network 28 to supply electrical power to the active heating element 62 if the amount of energy stored is below the predetermined value and the temperature measured by the temperature sensor 78 is below the predetermined value. In such embodiments, the treated exhaust gases are not hot enough for the thermo-electric-generator 66 to generated electrical energy or the passive heat exchanger 64 to withdraw heat from the treated exhaust gases.

In other instances, the heating system controller 76 may be configured to direct both the generator inlet valve 68 and the heat exchanger inlet valve 70 to open. In such embodiments, both valves 68, 70 may be opened if the temperature measured by the temperature sensor 78 is above the predetermined value and the amount of energy stored is below the predetermined value. In such cases, the heating system controller 76 may be configured to direct the electrical network 28 to stop providing electrical power to the active heating element 62. The passive heat exchanger 64 may withdraw heat from the flow of treated exhaust gases to heat the reducing agent in the flash-boil doser 32. Meanwhile, the flow of treated exhaust gases provided to the thermoelectric-generator 66 may cause the thermoelectric-generator 66 to generate more electrical energy to be stored in the battery 88.

The heating system controller 76 may be configured to direct the heat exchanger inlet valve 70 to close and direct the thermoelectric-generator 66 to supply electrical power to the active heating element 62. The heating system controller 76 may close the heat exchanger inlet valve 70 and direct the thermoelectric-generator 66 to supply electrical power if the amount of energy stored is above the predetermined value. The heating system controller 76 may also be configured to direct the generator inlet valve 68 to remain open if the amount of energy stored is above the predetermined value and the temperature measured by the temperature sensor 78 is above the predetermined value.

A possible method for reducing the electrical power consumption from the electrical network 28 of a vehicle 10 by the exhaust aftertreatment system 14 is to recover heat from the exhaust gases. Current aftertreatment systems may inject DEF using a flash-boil doser 32 that heats the DEF before injection in the flow of exhaust gases. The flash-boil doser 32 may include active heating elements 62 that heat the DEF using electrical power supplied to the electrical network 28 of the vehicle 10.

A solution to reducing the amount of electrical power consumption by the doser 32 is to integrate a waste heat recovery system 26 at the end of the exhaust line (i.e. after the catalysts in the aftertreatment system 14). The waste heat recovery system 26 is configured generate electrical power and/or use the heat of the exhaust gases to directly heat the flash-boil doser 32.

Reducing the amount of electrical power that is drawn from the vehicle's electrical network 28 reduces the amount of CO2 produced by the engine 12. For next generation emissions regulations, both CO2 and NOx may need to be significantly reduced. Reducing one of these without affecting the other will be a challenge. The flash-boil doser 32 is configured to supply urea to the SCR 22 to allow for DeNox (i.e. reducing the amount of nitrous oxide in the flow of exhaust gases. If the electrical power required to heat the doser 32 can be supplied or reduced by the waste heat recovery system 26, then the overall CO2 emissions may be reduced.

A method to control the heating system 52 when the heating of the reducing agent in the flash-boil doser 32 is also provided in this application. The heating system controller 76 of the waste heat recovery system 26 is provided that determines when passive heating alone can work, passive heating in combination with active heating, or active heating alone. The heating system controller 76 is also configured to determine what component, i.e. the thermo-electric-generator 66 and/or the electrical network 28, should provide the electrical power to the active heating element 62. The need to maintain sufficient heating of the reducing agent in the doser 32 is desired in many implementations to maintain efficiency of the doser 32 during cold start and extended low load/low duty cycles. A control algorithm will use exhaust flow, exhaust temperature, and/or stored energy levels—among other things—to determine when to switch on and off the active heat.

The following numbered clauses include embodiments that are contemplated and non-limiting:

Clause 1. An automotive exhaust aftertreatment system for dosing heated reducing agent into a flow of exhaust gases to reduce nitrous oxides in the flow of exhaust gases, the system comprising an exhaust conduit defining an exhaust passageway for receiving the flow of exhaust gases therein, a flash-boil doser mounted to the exhaust conduit and configured to heat a reducing agent to drive the reducing agent to a predetermined pressure and to inject the reducing agent into the flow of exhaust gases in the exhaust conduit upon reaching the predetermined pressure, the flash-boil doser including a doser body that defines a flash-boil chamber, an active heating element configured to produce heat from electrical energy to heat the reducing agent in the flash-boil chamber, and a passive heat exchanger configured to withdraw heat from exhaust gases to heat the reducing agent in the flash-boil doser, a catalyst coupled to the exhaust conduit and configured to react the reducing agent with the nitrous oxides in the flow of exhaust gases to provide treated exhaust gases with a reduced nitrous oxide amount, and a waste heat recovery system fluidly coupled to the exhaust conduit downstream of the catalyst and configured to selectively transfer heat from the treated exhaust gases directly to the flash-boil doser.

Clause 2. The system of clause 1, any other suitable clause, or any combination of suitable clauses, wherein the waste heat recovery system is fluidly coupled to the passive heat exchanger to provide the heat from the treated exhaust gases to the passive heat exchanger to heat the reducing agent in the flash-boil chamber and at least reduce an amount of electrical power used by the active heating element to heat the reducing agent in the flash-boil chamber.

Clause 3. The system of clause 2, any other suitable clause, or any combination of suitable clauses, wherein the waste heat recovery system includes a heat exchanger inlet valve fluidly connected between the exhaust passageway and the passive heat exchanger of the flash-boil doser to selectively provide a flow of treated exhaust gases to the passive heat exchanger and a heating system controller coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil chamber.

Clause 4. The system of clause 3, any other suitable clause, or any combination of suitable clauses, wherein the waste heat recovery system further includes a temperature sensor coupled to the exhaust passageway to measure a temperature of the treated exhaust gases in the exhaust passageway and the heating system controller is configured to direct the heat exchanger inlet valve to open in response to the temperature measured by the temperature sensor being above a predetermined value.

Clause 5. The system of clause 3, any other suitable clause, or any combination of suitable clauses, wherein the waste heat recovery system is coupled to the active heating element of the flash-boil doser and further configured to optionally generate electrical power from the heat of the treated exhaust gases in the exhaust passageway and provide the electrical power generated to the active heating element to heat the reducing agent in the flash-boil chamber.

Clause 6. The system of clause 5, any other suitable clause, or any combination of suitable clauses, wherein the waste heat recovery system further includes a thermoelectric-generator coupled to the exhaust passageway to receive the treated exhaust gases and generate electrical power from the heat of the treated exhaust gases for the active heating element of the flash-boil doser.

Clause 7. The system of clause 6, any other suitable clause, or any combination of suitable clauses, wherein the heating system controller is coupled to the thermoelectric-generator and configured to selectively direct the thermoelectric-generator to provide the electrical power generated by the thermoelectric-generator to the active heating element of the flash-boil doser to heat the reducing agent in the flash-boil doser.

Clause 8. An automotive exhaust aftertreatment system for dosing reducing agent into a flow of exhaust gases, the system comprising an exhaust conduit defining an exhaust passageway for receiving the flow of exhaust gases therein, a flash-boil doser mounted to the exhaust conduit and configured to heat a reducing agent to drive the reducing agent to a predetermined pressure and to inject the reducing agent into the flow of exhaust gases in the exhaust conduit upon reaching the predetermined pressure, the flash-boil doser including a doser body that defines a flash-boil chamber, an active heating element configured to produce heat from electrical energy to heat the reducing agent in the flash-boil chamber, and a passive heat exchanger configured to withdraw heat from exhaust gases to heat the reducing agent in the flash-boil doser, a catalyst coupled to the exhaust conduit and configured to react the reducing agent with the nitrous oxides in the flow of exhaust gases to provide treated exhaust gases with a reduced nitrous oxide amount, and a waste heat recovery system fluidly coupled to the exhaust conduit downstream of the catalyst and configured to selectively generate electrical power from the heat of the treated exhaust gases in the exhaust passageway, wherein the waste heat recovery system is coupled to the active heating element of the flash-boil doser to provide the electrical power generated from the heat of the treated exhaust gases to the active heating element to heat the reducing agent in the flash-boil chamber.

Clause 9. The system of clause 8, any other suitable clause, or any combination of suitable clauses, wherein the waste heat recovery system includes a thermoelectric-generator coupled to the exhaust passageway to receive the treated exhaust gases and generate electrical power from the heat of the treated exhaust gases for the active heating element of the flash-boil doser.

Clause 10. The system of clause 9, any other suitable clause, or any combination of suitable clauses, wherein the waste heat recovery system further includes a heating system controller coupled to the thermoelectric-generator to selectively provide electrical power from the thermoelectric-generator to the active heating element of the flash-boil doser to heat the reducing agent in the flash-boil doser.

Clause 11. The system of clause 10, any other suitable clause, or any combination of suitable clauses, wherein the waste heat recovery system is coupled to the passive heat exchanger and configure to selectively provide heat of the treated exhaust gases directly to the passive heat exchanger to heat the reducing agent in the flash-boil chamber and at least reduce an amount of electrical power used by the active heating element to heat the reducing agent in the flash-boil chamber.

Clause 12. The system of clause 11, any other suitable clause, or any combination of suitable clauses, wherein the waste heat recovery system further includes a heat exchanger inlet valve fluidly connected between the exhaust passageway and the passive heat exchanger of the flash-boil doser to selectively provide a flow of treated exhaust gases to the passive heat exchanger.

Clause 13. The system of clause 12, any other suitable clause, or any combination of suitable clauses, wherein the heating system controller is coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil doser.

Clause 14. An over-the-road vehicle comprising an internal combustion engine configured to produce a flow of exhaust gases that are conducted through an exhaust passageway, an electrical network coupled to the internal combustion engine and configured to generate electrical power from work produced by the internal combustion engine to power electrical components of the over-the-road vehicle, and an automotive exhaust aftertreatment system configured to treat the flow of exhaust gases.

Clause 15. The vehicle of clause 14, any other suitable clause, or any combination of suitable clauses, wherein the automotive exhaust aftertreatment system comprises a flash-boil doser mounted to the exhaust passageway and configured to heat the reducing agent to drive the reducing agent to a predetermined pressure and inject the reducing agent into the flow of exhaust gases upon reaching the predetermined pressure.

Clause 16. The vehicle of clause 14, any other suitable clause, or any combination of suitable clauses, wherein the flash-boil doser includes a doser body that defines a flash-boil chamber, an active heating element arranged in the flash-boil chamber and configured to produce heat from electrical energy to heat the reducing agent in the flash-boil chamber, and a passive heat exchanger arranged in the flash-boil chamber and configured to withdraw heat from exhaust gases to heat the reducing agent in the flash-boil doser.

Clause 17. The vehicle of clause 16, any other suitable clause, or any combination of suitable clauses, wherein the automotive exhaust aftertreatment system further comprises a catalyst coupled to the exhaust passageway and configured to react the reducing agent with the nitrous oxides in the flow of exhaust gases to provide treated exhaust gases with a reduced nitrous oxide amount.

Clause 18. The vehicle of clause 17, any other suitable clause, or any combination of suitable clauses, wherein the automotive exhaust aftertreatment system further comprises a waste heat recovery system fluidly coupled to the exhaust passageway downstream of the catalyst and configured to selectively transfer heat from the treated exhaust gases directly to the flash-boil doser.

Clause 19. The vehicle of clause 18, any other suitable clause, or any combination of suitable clauses, wherein the waste heat recovery system is fluidly coupled to the passive heat exchanger to provide the heat of the treated exhaust gases to the passive heat exchanger to heat the reducing agent in the flash-boil chamber and at least reduce an amount of electrical power provided by the electrical network to the active heating element to heat the reducing agent in the flash-boil chamber.

Clause 20. The vehicle of clause 19, any other suitable clause, or any combination of suitable clauses, wherein the waste heat recovery system includes a heat exchanger inlet valve fluidly connected between the exhaust passageway and the passive heat exchanger of the flash-boil doser to selectively provide a flow of treated exhaust gases to the passive heat exchanger.

Clause 21. The vehicle of clause 20, any other suitable clause, or any combination of suitable clauses, wherein the waste heat recovery system further includes a heating system controller coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil chamber.

Clause 22. The vehicle of clause 21, any other suitable clause, or any combination of suitable clauses, wherein the waste heat recovery system further includes a temperature sensor coupled to the exhaust passageway to measure a temperature of the treated exhaust gases in the exhaust passageway and the heating system controller is configured to direct the heat exchanger inlet valve to open in response to the temperature measured by the temperature sensor being above a predetermined value.

Clause 23. The vehicle of clause 21, any other suitable clause, or any combination of suitable clauses, wherein the waste heat recovery system further includes a thermoelectric-generator coupled to the exhaust passageway to receive treated exhaust gases and generate electrical power from the heat of the treated exhaust gases for the active heating element of the flash-boil doser.

Clause 24. The vehicle of clause 23, any other suitable clause, or any combination of suitable clauses, wherein the heating system controller is coupled to the thermoelectric-generator and configured to selectively direct the thermoelectric-generator to provide the electrical power generated by the thermoelectric-generator to the active heating element of the flash-boil doser to heat the reducing agent in the flash-boil doser and at least reduce the amount of electrical power provided by the electrical network.

Clause 25. The vehicle of clause 24, any other suitable clause, or any combination of suitable clauses, wherein the heating system controller is configured to selectively supply electrical power from one of the electrical network or the thermoelectric-generator.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An automotive exhaust aftertreatment system for dosing heated reducing agent into a flow of exhaust gases to reduce nitrous oxides in the flow of exhaust gases, the system comprising
   an exhaust conduit defining an exhaust passageway for receiving the flow of exhaust gases therein,
   a flash-boil doser mounted to the exhaust conduit and configured to heat a reducing agent to drive the reducing agent to a predetermined pressure and to inject the reducing agent into the flow of exhaust gases in the exhaust conduit upon reaching the predetermined pressure, the flash-boil doser including a doser body that defines a flash-boil chamber, an active heating element configured to produce heat from electrical energy to heat the reducing agent in the flash-boil chamber, and a passive heat exchanger configured to withdraw heat from exhaust gases to heat the reducing agent in the flash-boil doser,
   a catalyst coupled to the exhaust conduit and configured to react the reducing agent with the nitrous oxides in the flow of exhaust gases to provide treated exhaust gases with a reduced nitrous oxide amount, and
   a waste heat recovery system fluidly coupled to the exhaust conduit downstream of the catalyst and configured to selectively transfer heat from the treated exhaust gases directly to the flash-boil doser, wherein the waste heat recovery system is fluidly coupled to the passive heat exchanger to provide the heat from the treated exhaust gases to the passive heat exchanger to heat the reducing agent in the flash-boil chamber and at least reduce an amount of electrical power used by the active heating element to heat the reducing agent in the flash-boil chamber.

2. The system of claim 1, wherein the waste heat recovery system includes a heat exchanger inlet valve fluidly connected between the exhaust passageway and the passive heat exchanger of the flash-boil doser to selectively provide a flow of treated exhaust gases to the passive heat exchanger and a heating system controller coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil chamber.

3. The system of claim 2, wherein the waste heat recovery system further includes a temperature sensor coupled to the exhaust passageway to measure a temperature of the treated exhaust gases in the exhaust passageway and the heating system controller is configured to direct the heat exchanger inlet valve to open in response to the temperature measured by the temperature sensor being above a predetermined value.

4. The system of claim 2, wherein the waste heat recovery system is coupled to the active heating element of the flash-boil doser and further configured to optionally generate electrical power from the heat of the treated exhaust gases in the exhaust passageway and provide the electrical power generated to the active heating element to heat the reducing agent in the flash-boil chamber.

5. The system of claim 4, wherein the waste heat recovery system further includes a thermoelectric-generator coupled to the exhaust passageway to receive the treated exhaust gases and generate electrical power from the heat of the treated exhaust gases for the active heating element of the flash-boil doser.

6. The system of claim 5, wherein the heating system controller is coupled to the thermoelectric-generator and configured to selectively direct the thermoelectric-generator to provide the electrical power generated by the thermoelectric-generator to the active heating element of the flash-boil doser to heat the reducing agent in the flash-boil doser.

7. An automotive exhaust aftertreatment system for dosing reducing agent into a flow of exhaust gases, the system comprising
an exhaust conduit defining an exhaust passageway for receiving the flow of exhaust gases therein,
a flash-boil doser mounted to the exhaust conduit and configured to heat a reducing agent to drive the reducing agent to a predetermined pressure and to inject the reducing agent into the flow of exhaust gases in the exhaust conduit upon reaching the predetermined pressure, the flash-boil doser including a doser body that defines a flash-boil chamber, an active heating element configured to produce heat from electrical energy to heat the reducing agent in the flash-boil chamber, and a passive heat exchanger configured to withdraw heat from exhaust gases to heat the reducing agent in the flash-boil doser,
a catalyst coupled to the exhaust conduit and configured to react the reducing agent with the nitrous oxides in the flow of exhaust gases to provide treated exhaust gases with a reduced nitrous oxide amount, and
a waste heat recovery system fluidly coupled to the exhaust conduit downstream of the catalyst and configured to selectively generate electrical power from the heat of the treated exhaust gases in the exhaust passageway, wherein the waste heat recovery system is coupled to the active heating element of the flash-boil doser to provide the electrical power generated from the heat of the treated exhaust gases to the active heating element to heat the reducing agent in the flash-boil chamber.

8. The system of claim 7, wherein the waste heat recovery system includes a thermoelectric-generator coupled to the exhaust passageway to receive the treated exhaust gases and generate electrical power from the heat of the treated exhaust gases for the active heating element of the flash-boil doser and a heating system controller coupled to the thermoelectric-generator to selectively provide electrical power from the thermoelectric-generator to the active heating element of the flash-boil doser to heat the reducing agent in the flash-boil doser.

9. The system of claim 8, wherein the waste heat recovery system is coupled to the passive heat exchanger and configure to selectively provide heat of the treated exhaust gases directly to the passive heat exchanger to heat the reducing agent in the flash-boil chamber and at least reduce an amount of electrical power used by the active heating element to heat the reducing agent in the flash-boil chamber.

10. The system of claim 9, wherein the waste heat recovery system further includes a heat exchanger inlet valve fluidly connected between the exhaust passageway and the passive heat exchanger of the flash-boil doser to selectively provide a flow of treated exhaust gases to the passive heat exchanger, and wherein the heating system controller is coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil doser.

11. An over-the-road vehicle comprising
an internal combustion engine configured to produce a flow of exhaust gases that are conducted through an exhaust passageway,
an electrical network coupled to the internal combustion engine and configured to generate electrical power from work produced by the internal combustion engine to power electrical components of the over-the-road vehicle, and
an automotive exhaust aftertreatment system configured to treat the flow of exhaust gases, the system comprising
a flash-boil doser mounted to the exhaust passageway and configured to heat the reducing agent to drive the reducing agent to a predetermined pressure and inject the reducing agent into the flow of exhaust gases upon reaching the predetermined pressure, the flash-boil doser including a doser body that defines a flash-boil chamber, an active heating element arranged in the flash-boil chamber and configured to produce heat from electrical energy to heat the reducing agent in the flash-boil chamber, and a passive heat exchanger arranged in the flash-boil chamber and configured to withdraw heat from exhaust gases to heat the reducing agent in the flash-boil doser,
a catalyst coupled to the exhaust passageway and configured to react the reducing agent with the nitrous oxides in the flow of exhaust gases to provide treated exhaust gases with a reduced nitrous oxide amount, and
a waste heat recovery system fluidly coupled to the exhaust passageway downstream of the catalyst and configured to selectively transfer heat from the treated exhaust gases directly to the flash-boil doser,
wherein the waste heat recovery system is fluidly coupled to the passive heat exchanger to provide the heat of the treated exhaust gases to the passive heat exchanger to heat the reducing agent in the flash-boil chamber and at least reduce an amount of electrical power provided by the electrical network to the active heating element to heat the reducing agent in the flash-boil chamber.

12. The over-the-road vehicle of claim 11, wherein the waste heat recovery system includes a heat exchanger inlet valve fluidly connected between the exhaust passageway and the passive heat exchanger of the flash-boil doser to selectively provide a flow of treated exhaust gases to the passive heat exchanger and a heating system controller coupled to the heat exchanger inlet valve and configured to selectively open and close the heat exchanger inlet valve to control the flow of treated exhaust gases to the passive heat exchanger to manage the heat provided by the passive heat exchanger to the reducing agent in the flash-boil chamber.

13. The over-the-road vehicle of claim 12, wherein the waste heat recovery system further includes a temperature sensor coupled to the exhaust passageway to measure a temperature of the treated exhaust gases in the exhaust passageway and the heating system controller is configured to direct the heat exchanger inlet valve to open in response to the temperature measured by the temperature sensor being above a predetermined value.

14. The over-the-road vehicle of claim 12, wherein the waste heat recovery system further includes a thermoelectric-generator coupled to the exhaust passageway to receive treated exhaust gases and generate electrical power from the heat of the treated exhaust gases for the active heating element of the flash-boil doser, and wherein the heating system controller is coupled to the thermoelectric-generator and configured to selectively direct the thermoelectric-generator to provide the electrical power generated by the thermoelectric-generator to the active heating element of the flash-boil doser to heat the reducing agent in the flash-boil doser and at least reduce the amount of electrical power provided by the electrical network.

15. The over-the-road vehicle of claim 14, wherein the heating system controller is configured to selectively supply electrical power from one of the electrical network or the thermoelectric-generator.

* * * * *